United States Patent
Kim et al.

(10) Patent No.: US 12,534,552 B2
(45) Date of Patent: Jan. 27, 2026

(54) ANTIBACTERIAL POLYMER

(71) Applicant: LG Chem, Ltd., Seoul (KR)

(72) Inventors: Byungguk Kim, Daejeon (KR); Sanggon Kim, Daejeon (KR); Seonjung Jung, Daejeon (KR); Ji Seok Lee, Daejeon (KR); Haesung Yun, Daejeon (KR); Hyungsam Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 874 days.

(21) Appl. No.: 17/791,423

(22) PCT Filed: Sep. 15, 2021

(86) PCT No.: PCT/KR2021/012606
§ 371 (c)(1),
(2) Date: Jul. 7, 2022

(87) PCT Pub. No.: WO2022/060091
PCT Pub. Date: Mar. 24, 2022

(65) Prior Publication Data
US 2023/0331883 A1    Oct. 19, 2023

(30) Foreign Application Priority Data

Sep. 16, 2020 (KR) .................. 10-2020-0119287
Sep. 15, 2021 (KR) .................. 10-2021-0122917

(51) Int. Cl.
*C08F 120/36*    (2006.01)
*C08F 220/14*    (2006.01)
*C08L 33/14*    (2006.01)
*C12N 1/20*    (2006.01)

(52) U.S. Cl.
CPC .............. *C08F 120/36* (2013.01); *C12N 1/20* (2013.01)

(58) Field of Classification Search
CPC ........ C08F 120/36; C08F 220/14; C12N 1/20; C08L 33/14
See application file for complete search history.

(56) References Cited

U.S. PATENT DOCUMENTS

| | | | |
|---|---|---|---|
| 6,060,207 | A | 5/2000 | Shida et al. |
| 6,150,479 | A | 11/2000 | Klemarczyk et al. |
| 9,475,967 | B2 | 10/2016 | Lipscomb et al. |
| 2009/0208740 | A1 | 8/2009 | Kavanagh et al. |

(Continued)

FOREIGN PATENT DOCUMENTS

| | | |
|---|---|---|
| CN | 102131836 A | 7/2011 |
| CN | 102167681 B | 10/2012 |

(Continued)

OTHER PUBLICATIONS

Search Report dated Nov. 27, 2023 from Office Action for Chinese Application No. 202180007045.X, issued Nov. 30, 2023. 2 pgs.

(Continued)

*Primary Examiner* — Catherine S Branch
(74) *Attorney, Agent, or Firm* — Lerner David LLP

(57) ABSTRACT

An antibacterial polymer having a molecular weight above a certain level, which is highly miscible with other polymers compared to a monomolecular type antibacterial agent and can be added during the melt extrusion process. Further the antibacterial polymer has the advantage of exhibiting excellent antibacterial properties against Gram-negative bacteria and does not elute over time.

10 Claims, 1 Drawing Sheet

(56) References Cited

U.S. PATENT DOCUMENTS

| | | | |
|---|---|---|---|
| 2009/0324536 | A1 | 12/2009 | Sun et al. |
| 2010/0151388 | A1 | 6/2010 | Yang et al. |
| 2010/0222426 | A1 | 9/2010 | Gibbons et al. |
| 2010/0240923 | A1 | 9/2010 | Haering et al. |
| 2014/0294968 | A1 | 10/2014 | Hofmann et al. |
| 2015/0037526 | A1 | 2/2015 | Seth et al. |
| 2016/0060492 | A1 | 3/2016 | Zhang et al. |
| 2018/0141080 | A1 | 5/2018 | Kirk et al. |
| 2019/0218423 | A1 | 7/2019 | Bartusiak et al. |
| 2020/0369590 | A1 | 11/2020 | Van Campenhout et al. |
| 2021/0108017 | A1 | 4/2021 | Krayer et al. |

FOREIGN PATENT DOCUMENTS

| | | |
|---|---|---|
| CN | 103881010 A | 6/2014 |
| CN | 110668942 A | 1/2020 |
| CN | 110724229 A | 1/2020 |
| CN | 110981999 A | 4/2020 |
| JP | 2004217528 A | 8/2004 |
| JP | 2006152035 A | 6/2006 |
| JP | 2008050415 A | 3/2008 |
| JP | 2010539150 A | 12/2010 |
| KR | 100601393 B1 | 7/2006 |
| KR | 20100068083 A | 6/2010 |
| KR | 20100093404 A | 8/2010 |
| KR | 20140051314 A | 4/2014 |
| KR | 20200098865 A | 8/2020 |
| WO | 2006057086 A1 | 6/2006 |
| WO | 2012069908 A2 | 5/2012 |
| WO | 2015157019 A1 | 10/2015 |
| WO | 2020-095808 A1 | 5/2020 |

OTHER PUBLICATIONS

Agasti, S. et al., "Orthogonal Selectivity in C—H Olefination: Synthesis of Branched Vinylarene with Unactivated Aliphatic Substitution," ACS Catalysis, Sep. 2019, pp. 9606-9613, vol. 9.

Castagnet, T. et al., "Non-thermal Microwave Effects in Radical Polymerization of Bio-based Terpenoid (Meth) acrylates," Polymer Chemistry, Oct. 2020, pp. 1-8.

Chapman, R. S. L. et al., "Formyloxyacetoxyphenylmethane and 1,1-diacylals as versatile O-formylating and Oacylating reagents for alcohols," Tetrahedron, Sep. 2018, pp. 1-12.

Chen, H. et al., "Sterically Controlled C—H Olefination of Heteroarenes," Angewandte Chemie, Jul. 2020, pp. 1-9.

De Visser, A. C. et al., "Bulk Polymerization of Cholesteryl Acrylate," Polymer Letters, Nov. 1970, pp. 805-808, vol. 8, John Wiley & Sons.

Droesbeke, M. A. et al., "Biosourced terpenoids for the development of sustainable acrylic pressure-sensitive adhesives via emulsion polymerisation," Green Chemistry, Jun. 2020, pp. 1-10.

Droesbeke, M. A. et al., "Sustainable Synthesis of Renewable Terpenoid-Based (Meth)acrylates Using the CHEM21 Green Metrics Toolkit," ACS Sustainable, May 2019, pp. 11633-11639, vol. 7.

Heeres, A. et al "Solvent-Free Lipase-Catalyzed Production of (Meth)acrylate Monomers: Experimental Results and Kinetic Modeling," Biochemical Engineering Journal, Nov. 2018, pp. 1-27.

Huang, X. et al., "Combining the catalytic enantioselective reaction of visible-light-generated radicals with a by-product utilization system," Chemical Science, Sep. 2017, pp. 1-6.

International Search Report for Application No. PCT/KR2021/012606 mailed Dec. 30, 2021, pp. 1-3.

International Search Report for Application No. PCT/KR2021/012668 mailed Dec. 28, 2021, pp. 1-3.

Kumar, M. et al., "Ru(II)-Catalyzed Oxidative Olefination of Benzamides: Switchable Aza-Michael and Aza-Wacker Reaction for Synthesis of Isoindolinones," Organic Letters, Apr. 2020, pp. A-G.

Li, Y. et al., "An efficient DABCO-catalyzed ireland-claisen rearrangement of allylic acrylates," Chem. Inform, Feb. 2007, 1 page.

Lokhande. G. P. et al., "Synthesis ofN-(2 mnino benzothiazole) methacylmnide monomer and its copolymers for antimicrobial coating application by RAFT polymerization," International Journal of Polymeric Materials and Polymeric Biomaterials, Dec. 2015. vol. 65. pp. 391-401.

Lv, Y. et al., "Cu-catalyzed intermolecular oxyalkylation of styrenes under air: access to diverse iminolactones," RSC Advances, Aug. 2017, pp. 41723-41726.

Meng, K. et al., "Geminal group-directed olefinic C—H functionalization via four- to eight-membered exo-metallocycles," Nature Communications, Nov. 2019, pp. 1-10.

Ng, J. Q. et al., "Chemoselective Transesterification of Methyl (Meth)acrylates Catalyzed by Sodium(I) or Magnesium(II) Aryloxides," ACS Catalysis, Dec. 2020, pp. 199-207, vol. 11.

Qiu, Y. et al., "Electrooxidative Rhodium-Catalyzed C—H/C—H Activation: Electricity as Oxidant for Cross-Dehydrogenative Alkenylation," Angewandte Chemie, May 2018, pp. 1-7.

Rehberg, C. E. et al., "Preparation and Polymerization of Acrylic Esters of Olefinic Alcohols," Contribution from the Eastern Regional Research Laboratory, Aug. 1946, pp. 226-231.

Richter, C. et al., "Tailor-made N-Heterocyclic Carbenes for Nanoparticle Stabilization," Chem. Comm., Jan. 2014, pp. 1-4.

Russell, G.A. et al., "8-Endo versus 5-Exo Cyclization of Unsaturated Acrylate Esters upon Reaction with t-BuHgi/KI" Tetrahedron Letters, vol. 37, No. 15, pp. 2557-2560, Apr. 1996.

Russell, G.A. et al., "Cyclizations in the Addition of Alkylmercury Halides to Dienes and Enynes," Journal of Chemical Society, Oct. 1996, pp. 9831-9840, vol. 118.

Tale. N. V. et al. "Synthesis and polymerization of N-(2,4,5-trichlorophenyl) acrylamide monomer and its thermal and antimicrobial properties," International Journal of Polymeric Materials, Nov. 2011. vol. 60. pp. 1070-1078.

Wang, M. et al., "Mizoroki-Heck Reaction of Unstrained Aryl Ketones via Ligand-Promoted C—C Bond Olefination" Oragnic Letters, May 2021, pp. 2147-2152, vol. 23.

Worzakowska, M. "Thermal studies on the starch-g-copolymers prepared from two terpene acrylate monomers under oxidative conditions," Journal of Thermal Analysis and Calorimetry, Feb. 2019, pp. 1-7.

Worzakowska, M., "Novel starch-g-copolymers obtained using acrylate monomers prepared from two geometric somers of terpene alcohol," European Polymer Journal, Nov. 2018, pp. 1-36.

Worzakowska, M., "Synthesis and some physico-chemical properties of novel starch-g-poly(citronellyl acrylate) copolymers," Maria Curie-Sklodowska University, Feb. 2018, pp. 1-26.

Worzakowska, M., "Thermo-oxidative decomposition behavior of starch-g-poly(citronellyl methacrylate) and starch-g-poly(citronellyl acrylate) copolymers," Journal of Thermal Analysis and Calorimetry, Jan. 2018, pp. 1-9.

Xu, J. et al., "Nickel-Catalysed Cyclopropanation of Electron-Deficient Alkenes with Diiodomethane and Diethylzinc," Communication, Jan. 2016, pp. 1-5.

Zhang, J. et al., "Acid- and Base-Switched Palladium-Catalyzed y-C(sp3)-H Alkylation and Alkenylation of Neopentylamine" Organic Letters, Apr. 2021, pp. 3466-3471, vol. 23.

Zhao, J. et al., "Synthesis of Terpene-Based Polymers," Biosynthetic Polymer Conjugates, Mar. 2012, pp. 151-190, vol. 253, Springer, Berlin.

Turos, E. et al., "Antibiotic-conjugated polyacrylate nanoparticles: New opportunities for development of anti-MRSA agents" Bioorganic & Medicinal Chemistry Letters, Elsevier Ltd, Dec. 2006, vol. 17, No. 1, pp. 53-56.

Kalayci, S. et al., "Determination of antimicrobial properties of Picaridin and DEET against a broad range of microorganisms" World Journal of Microbiology and Biotechnology, Springer Netherlands, Aug. 2013, vol. 30, No. 2, pp. 407-411.

Extended European Search Report including Written Opinion for Application No. 21869713.4 dated Apr. 3, 2023, pp. 1-10.

Extended European Search Report for Application No. 21869738.1 dated May 22, 2023. 2 pgs.

(56) References Cited

OTHER PUBLICATIONS

Stebbins Nicholas D et al: "Antibiotic-containing polymers for localized, sustained drug delivery", Advanced Drug Delivery Reviews, Elsevier, Amsterdam, NL, vol. 78, Apr. 18, 2014 (Apr. 18, 2014), pp. 77-87, XP029104077.

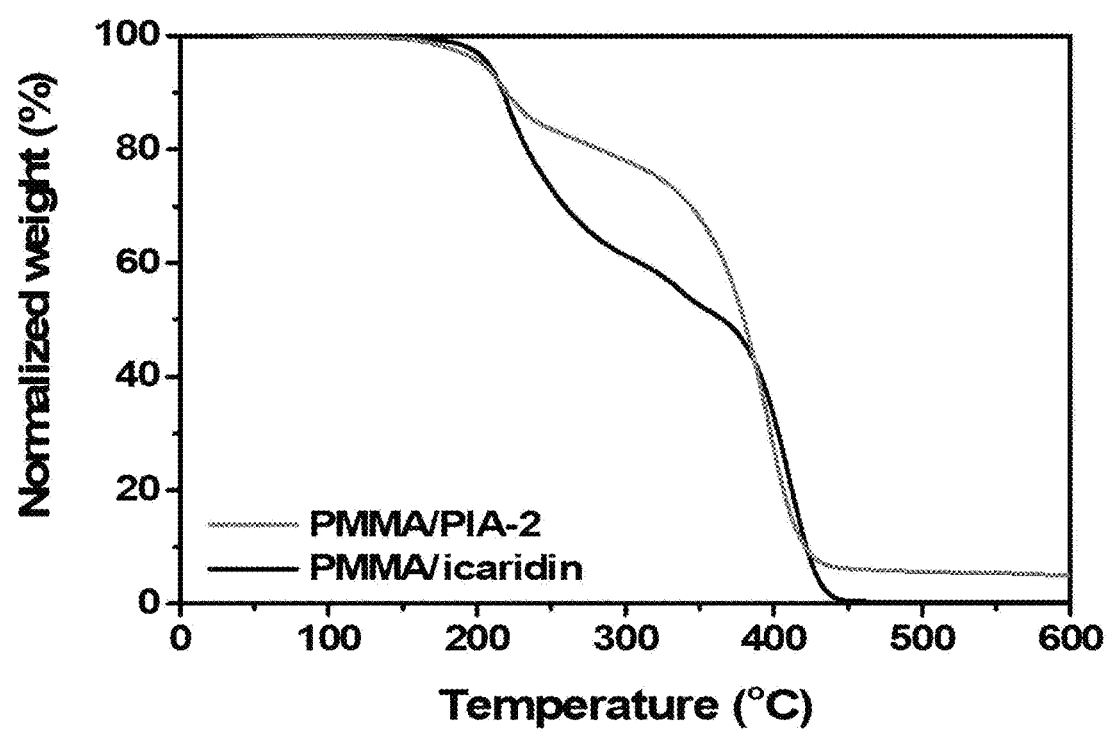

ANTIBACTERIAL POLYMER

CROSS-REFERENCE TO RELATED APPLICATION(S)

The present application is a national phase entry under 35 U.S.C. § 371 of International Application No. PCT/KR2021/012606, filed on Sep. 15, 2021, which claims priority to Korean Patent Application No. 10-2020-0119287, filed on Sep. 16, 2020, and Korean Patent Application No. 10-2021-0122917, filed on Sep. 15, 2021, the disclosures of which are incorporated herein by reference in their entirety.

TECHNICAL FIELD

The present disclosure relates to an antibacterial polymer and an antibacterial polymer composite including the same.

BACKGROUND ART

In recent years, along with the diversification of life, the improvement of living standards, and the changes and improvement of consciousness, there is a growing interest in improving hygiene and comfort in the living environment of individuals. Thus, studies on microorganisms that threaten these are being conducted, but not only the types of microorganisms present in the daily living environment are very large, but also the microorganisms are widely distributed in the natural world, and the damage resulting therefrom becomes serious.

In particular, microorganisms such as bacteria and mold can inhabit in various environments such as dietary life, housing environment, clothing, and industrial products. At this time, the bacteria can cause various inflammations, food poisoning or the like, and the mold not only generates a bad odor, but also causes various skin diseases, respiratory diseases, allergies, atopic dermatitis, and the like, which are problematic. In addition, in the case of microorganisms that inhabit on the surface of electronic products and daily necessities, it may be a factor of deterioration of product performance.

Therefore, in order to prevent damage to humans by these microorganisms, various antibacterial substances have been developed to inhibit the growth of microorganisms or to kill microorganisms.

Specifically, the conventionally developed antibacterial agents can be broadly divided into an inorganic antibacterial agent and an organic antibacterial agent. The inorganic antibacterial agent is an antibacterial agent containing a metal such as silver or copper, and has the advantage that the thermal stability is excellent, and antibacterial properties can be maintained even under high temperature conditions. Further, there is a problem that the price is expensive and it is likely to be discolored due to the metal ions contained after processing. In addition, organic antibacterial agents have advantages in that they are cheaper than inorganic antibacterial agents and have excellent antibacterial effects even in small amounts, but there has been a problem that antibacterial sustainability is not good because it is likely to be eluted after application to the product.

Moreover, the organic antibacterial agent can secure the stability of the product in terms of inhibition of reproduction and death of microorganisms, and at the same time, it is toxic and may also cause irritation to the user's skin.

Therefore, there is a need for an antibacterial agent in the form of a polymer that exhibits excellent antibacterial properties and has low possibility of elution.

DETAILED DESCRIPTION OF THE INVENTION

Technical Problem

It is one object of the present disclosure to provide an antibacterial polymer exhibiting excellent antibacterial properties.

It is another object of the present disclosure to provide an antibacterial polymer composite comprising the above-mentioned antibacterial polymer.

Technical Solution

In order to achieve the above object, according to one aspect, there is provided an antibacterial polymer comprising a repeating unit represented by the following Chemical Formula 1:

[Chemical Formula 1]

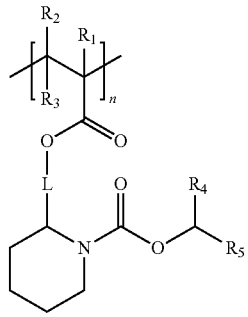

wherein, in Chemical Formula 1,
$R_1$ to $R_3$ are each independently hydrogen, or methyl,
$R_4$ and $R_5$ are each independently hydrogen, an alkyl having 1 to 10 carbon atoms, or an aryl having 6 to 30 carbon atoms,
L is a single bond, or an alkylene having 1 to 10 carbon atoms, and
n is an integer of 50 to 1,000.

According to another aspect, there is provided an antibacterial polymer composite comprising the antibacterial polymer described above.

Advantageous Effects

An antibacterial polymer according to the present disclosure has a molecular weight above a certain level, and thus is highly miscible with other polymers compared to a monomolecular type antibacterial agent and can be added during the melt extrusion process. Further the antibacterial polymer has advantages that it has an excellent effect of inhibiting bacterial growth and, at the same time, does not elute over time.

BRIEF DESCRIPTION OF THE DRAWING

The FIGURE shows the results of Experimental Example 3 of the present disclosure.

DETAILED DESCRIPTION OF THE EMBODIMENTS

As used herein, the terms "a first," "a second," etc. are used herein to explain various constitutional elements, and these terms are used only to distinguish one constitutional element from another constitutional element.

The technical terms used herein is only to explain exemplary embodiments and is not intended to limit the scope of the present disclosure. The singular forms "a," "an" and "the" are intended to include plural forms, unless the context clearly indicates otherwise. It should be understood that the terms "comprise," "include", "have", etc. are used herein to specify the presence of stated features, integers, steps, components or combinations thereof, but do not preclude the presence or addition of one or more other features, integers, steps, components, or combinations thereof.

Also, as used herein, in case a layer or an element is mentioned to be formed "on" layers or elements, it means that the layer or element is directly formed on the layers or elements, or it means that other layers or elements may be additionally formed between the layers, on a subject, or on a substrate.

Although the present disclosure may have various forms and various modifications may be made thereto, specific examples will be exemplified and explained in detail below. However, it is not intended to limit the present disclosure to specific disclosure, and it should be understood that the present disclosure includes all the modifications, equivalents or replacements thereof without departing from the spirit and technical scope of the invention.

Further, terms used in the present disclosure are used only to describe specific exemplary embodiments, and are not intended to limit the present disclosure. A singular form may include a plural form if there is no clearly opposite meaning in the context.

Meanwhile, the term "(meth)acrylate" as used herein includes not only acrylate but also methacrylate.

Further, as used herein, the "alkyl having 1 to 10 carbon atoms" collectively refers to a linear, branched or cyclic alkyl group having 1 to 10 carbon atoms. Specifically, the alkyl group having 1 to 10 carbon atoms may be a linear alkyl group having 1 to 10 carbon atoms; a linear alkyl group having 1 to carbon atoms; a branched or cyclic alkyl group having 3 to 10 carbon atoms; or a branched or cyclic alkyl group having 3 to 10 carbon atoms. Specific examples include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are is not limited thereto.

Further, the "aryl having 6 to 30 carbon atoms" as used herein may be a monocyclic or polycyclic aryl group. Specifically, it may be a monocyclic aryl group having 6 to 15 carbon atoms; a polycyclic aryl group having 10 to 30 carbon atoms. Specific examples of the monocyclic aryl group may be a phenyl group, a biphenyl group, a terphenyl group, and the like, but is not limited thereto. Further, the polycyclic aryl group may include a naphthyl group, an anthryl group, a phenanthryl group, a pyrenyl group, a perylenyl group, a chrysenyl group, a fluorenyl group, and the like, but is not limited thereto.

Generally, in order to exhibit antibacterial properties to household chemical products that are used in everyday living spaces such as homes, offices, and multiple facilities, antibacterial coating capable of preventing propagation of microorganisms and/or killing microorganisms such as bacteria has been carried out on the surface of these household chemical products. At this time, the antibacterial agent contained in the antibacterial coating damages the cell membrane or cell wall of microorganisms or induces denaturation of these proteins, which inhibits growth of microorganisms, and propagates and/or kills microorganisms.

However, the confirmed bacteria (strains) are not only more than 5,000 species, but also have various characteristics, for example, they can be classified into Gram-positive bacteria and Gram-negative bacteria according to the cell wall layer, and can be classified into aerobic bacteria, facultative bacteria, and anaerobic bacteria, etc. according to the degree of oxygen requirement. Moreover, the shape of bacterial cells are also diverse, such as spherical, rod-shaped, spiral-shaped, and the like. Therefore, since it is usually not easy for one type of antibacterial agent to have a physical/chemical mechanism that can damage the cell membranes/cell walls of various bacteria or denature proteins, research is being conducted to develop antibacterial agents that can exhibit excellent antibacterial properties against specific types of bacteria.

In particular, Gram-negative bacteria, that can be confirmed to be stained red when stained with a Gram staining method among bacteria, include *Proteus mirabilis, Escherichia coli, Salmonella typhi, Pseudomonas aeruginosa, Vibrio cholerae*, and the like. However, these Gram-negative bacteria can cause secondary infections such as respiratory-related pneumonia and urinary tract infections in patients with an advanced disease and a weakened immunity, which are particularly problematic. These Gram-negative bacteria have an outer membrane composed of lipopolysaccharide, lipoprotein, and other complex high molecular materials, instead of having peptidoglycans whose cell walls are relatively thin compared to Gram-positive bacteria. Therefore, in order to exhibit antibacterial properties against Gram-negative bacteria, it is necessary to develop antibacterial agents capable of effectively denaturing or destroying the cell walls or outer membranes.

Further, if the used antibacterial agent elutes with the passage of time, or if the user is exposed to persistent antibacterial agents, rather, problems such as threatening the heath of users have occurred.

In view of the above, the present inventors have found that, in the case of antibacterial polymers containing a repeating unit having a specific structure, hydrophobic diffusion of the antibacterial polymers occurs due to van der Waals force induced between the hydrophobic part of the antibacterial polymers and the hydrophobic cell wall of bacteria such as Gram-negative bacteria, which can destroy bacterial cell walls, thereby inhibiting propagation of bacteria and killing bacteria. The present disclosure has been completed on the basis of such findings.

In addition, the antibacterial polymer has a molecular weight above a certain level, and thus is highly miscible with other polymers compared to a monomolecular type antibacterial agent. Moreover, unlike the monomolecular type antibacterial agent whose use is restricted in melt extrusion processes due to its low boiling point, the antibacterial polymer has a high glass transition temperature and thus, it has an advantage that it can be added during the melt extrusion process.

An antibacterial polymer, an antibacterial polymer composite and an antibacterial article including the same according to specific embodiments of the present disclosure will be described in more detail below.

Antibacterial Polymer

The antibacterial polymer of one embodiment includes a repeating unit represented by the following Chemical Formula 1:

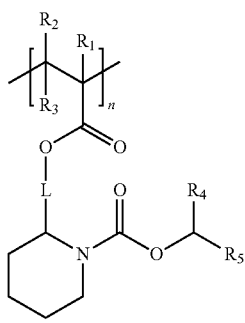

[Chemical Formula 1]

wherein, in Chemical Formula 1,
$R_1$ to $R_3$ are each independently hydrogen, or methyl,
$R_4$ and $R_5$ are each independently hydrogen, an alkyl having 1 to 10 carbon atoms, or an aryl having 6 to 30 carbon atoms,
L is a single bond, or an alkylene having 1 to 10 carbon atoms, and
n is an integer of 50 to 1,000.

The antibacterial polymer includes a repeating unit derived from an Icaridin-based compound, and thus, hydrophobic diffusion occurs due to van der Waals force between the substituents $R_4$ and $R_5$, which are the hydrophobic moieties of the repeating unit, and the hydrophobic cell wall of bacteria. That is, as the antibacterial polymer diffuses into the bacterial cell wall, the destruction of the cell wall of bacteria may be induced, thereby slowing down the growth rate of the bacteria.

In particular, the antibacterial polymer containing a repeating unit derived from an Icaridin-based compound includes an alkylene linker such as L and the longer aliphatic chain substituents $R_4$ and $R_5$ in the repeating unit, and thus, can diffuse better into the cell wall of bacteria and exhibit excellent antibacterial properties, as compared with a polymer containing a repeating unit derived from menthol and a polymer containing a repeating unit derived from cholesterol.

Further, the number of repeating units represented by Chemical Formula 1 included in the antibacterial polymer must be a maximum of 50 or more, that is, n, which means the number of the repeating units, must be 50 or more, and is a maximum of 1,000 or less, that is, n is 1,000 or less. When the n is less than 50, there is a problem that it has the form of a monomer or oligomer, thus has poor miscibility with other polymers, is difficult to apply to the melt extrusion process, and can be easily eluted during production of antibacterial articles. When n is greater than 1,000, there is a problem that the chain becomes too long and an entanglement phenomenon occurs, the mobility of the polymer decreases, the diffusion of the polymer to the cell wall of bacteria becomes difficult, so that it may be difficult to exhibit antibacterial properties. Specifically, n may be 50 or more, 55 or more, or 60 or more, and 1,000 or less, 900 or less, 800 or less, 700 or less, 600 or less, 500 or less, 400 or less, 300 or less, or 200 or less.

Further, in Chemical Formula 1, $R_1$ may be hydrogen or methyl, and $R_2$ and $R_3$ may be hydrogen. For example, $R_1$ to $R_3$ may all be hydrogen.

Further, in Chemical Formula 1, L may be a single bond, methylene, ethylene, propylene, or butylene. For example, L can be methylene, or ethylene.

Further, $R_4$ and $R_5$ may be each independently an alkyl having 1 to 10 carbon atoms. Specifically, $R_4$ and $R_5$ may be each independently methyl, ethyl, or isopropyl.

Further, $R_4$ and $R_5$ may be different from each other. For example, $R_4$ may be methyl and $R_5$ may be ethyl.

For example, the antibacterial polymer may be represented by the following Chemical Formula 1-1:

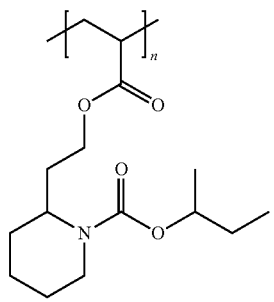

[Chemical Formula 1-1]

wherein, in Chemical Formula 1-1,
n is an integer of 50 to 1,000.

In this case, the repeating unit represented by Chemical Formula 1-1 can be regarded as including all repeating units of stereoisomers represented by the following Chemical Formulas 1-1-1 to 1-1-4, respectively:

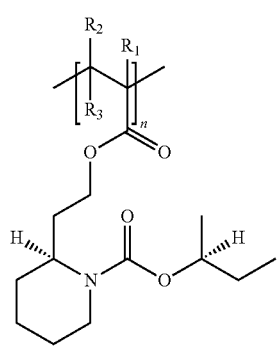

[Chemical Formula 1-1-1]

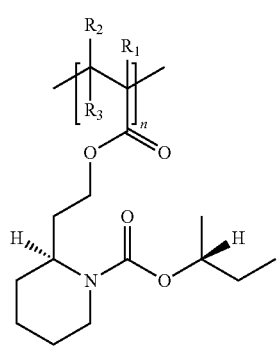

[Chemical Formula 1-1-2]

[Chemical Formula 1-1-3]

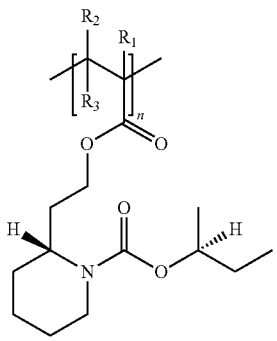

[Chemical Formula 1-1-4]

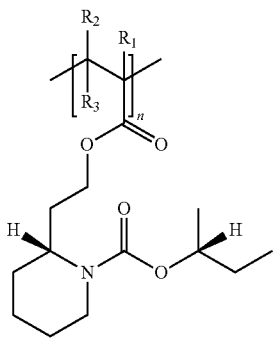

wherein, in Chemical Formulas 1-1-1 to 1-1-4, n is an integer of 50 to 1,000.

In this case, the repeating unit represented by Chemical Formula 1 may be derived from a monomer compound represented by the following Chemical Formula 1A'.

[Chemical Formula 1A']

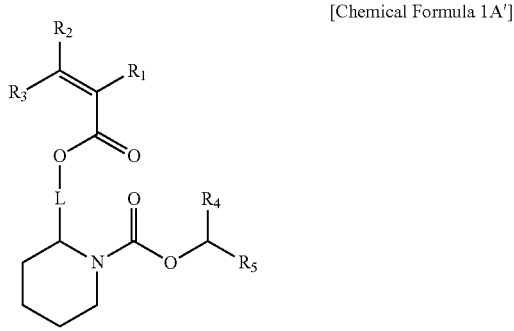

wherein, in Chemical Formula 1A', the definition of each substituent is the same as defined in Chemical Formula 1 above.

Further, the antibacterial polymer according to one embodiment may be a homopolymer containing only the repeating unit represented by Chemical Formula 1. Specifically, the antibacterial polymer has a one-dimensional linear polymer form having a structure in which repeating units are arranged in long chains. This is distinguished from a network polymer having a three-dimensional network structure in which repeating units are connected by a crosslinking agent added separately. When such antibacterial polymer in the form of a linear polymer is used, the molecular weight of the polymer can be easily adjusted and the viscosity of the antibacterial polymer can be easily adjusted.

Further, the antibacterial polymer may have a weight average molecular weight (Mw) of 5,000 to 200,000 g/mol. When the weight average molecular weight of the antibacterial polymer is less than 5,000 g/mol, it exists in the form of a monomer rather than a polymer and thus, can be easily eluted. Further, due to its low molecular weight, it causes a problem of being absorbed by the human body. When the weight average molecular weight of the antibacterial polymer exceeds 200,000 g/mol, it is not appropriate because the molecular weight becomes larger and a phase separation phenomenon may occur during the formation of the polymer composite. Specifically, the weight average molecular weight (Mw, g/mol) of the antibacterial polymer may be 5,000 or more, 10,000 or more, 20,000 or more, or 30,000 or more, and 200,000 or less, 120,000 or less, or 100,000 or less.

At this time, the weight average molecular weight (Mw) of the antibacterial polymer can be measured by gel permeation chromatography (GPC) using polystyrene (PS) as a standard sample for calibration. More specifically, 200 mg of the antibacterial polymer was diluted with 200 ml of N,N-dimethylformamide (DMF) solvent to prepare about 1000 ppm of a sample and then, the weight average molecular weight can be measured by a RI detector at a flow rate of 1 ml/min using an Agilent 1200 series GPC instrument. At this time, the molecular weight of the sample can be calculated based on a calibration curve using 8 PS standards.

Further, the antibacterial polymer may have a glass transition temperature (Tg) of 0° C. to 200° C. When the glass transition temperature (Tg) of the antibacterial polymer is too low, it may adversely affect the mechanical physical properties possessed by existing polymers during the formation of a polymer composite. When the glass transition temperature (Tg) is too high, during processing of the antibacterial polymer composite, a phase separation phenomenon may occur and the antibacterial activity may decrease.

Such an antibacterial polymer can exhibit excellent antibacterial effects against microorganisms, particularly Gram-negative bacteria. Specifically, the antibacterial polymer can exhibit antibacterial properties against *Proteus mirabilis*, which generates a secondary odor through the production of ammonia. In addition, the antibacterial polymer can exhibit antibacterial properties against Gram-negative bacteria such as *Escherichia coli*.

Here, *Proteus mirabilis* is Gram-negative bacillus, facultative anaerobic or aerobic bacteria, which are distributed in various environments, and can be infected on the respiratory organ or skin of humans and animals to cause urinary system-related diseases. In particular, when a human is infected with the *Proteus mirabilis*, it is known to cause urinary tract infection or acute pyelonephritis. In addition, *Proteus mirabilis* alkalizes urine and allows ammonia to be excreted, thereby causing odor.

Specifically, the antibacterial property evaluation of the antibacterial polymer against *Proteus mirabilis* can be measured using absorbance, and thereby, the bacterial growth inhibition rate of *Proteus mirabilis* bacteria of the antibacterial polymer calculated by the following Equation 1 may be 40% or more.

$$\text{Bacterial growth inhibition rate (\%)} = \left(1 - \frac{A_S}{A_0}\right) \times 100 \quad \text{[Equation 1]}$$

In the above equation, $A_s$ is the absorbance of the experimental group, which is the absorbance at 600 nm wavelength of the *Proteus Mirabilis* culture medium to which the sample was added, and $A_0$ is the absorbance of the control group, which is the absorbance at 600 nm wavelength of a pure culture medium of *Proteus mirabilis* to which the sample was not added.

Antibacterial Polymer Composite

Meanwhile, according to another aspect, there is provided an antibacterial polymer composite including the antibacterial polymer described above.

The antibacterial polymer may further include one or more polymers selected from the group consisting of polymethyl methacrylate (PMMA), polyethylene (PE), polypropylene (PP), polystyrene (PS), polyamide (PA), polyimide (PI), polyethylene terephthalate (PET), polyvinyl chloride (PVC), acryloyl-butadiene-styrene (ABS) and polyacrylic acid (PA). The above-mentioned antibacterial polymer has an appropriate weight average molecular weight and thus can exhibit high miscibility with these polymers.

Consequently, the antibacterial polymer composite can be easily produced by adding the antibacterial polymer and other polymers together during the melt extrusion process, the produced antibacterial polymer composite exhibits excellent antibacterial activity against bacteria such as Gram-negative bacteria, and at the same time, can maintain such antibacterial activity even after a long period of time, and is also suitable in terms of human safety.

Further, within the antibacterial polymer composite, the antibacterial polymer may be contained in an amount of 0.5 to 50% by weight based on the total weight of the antibacterial polymer composite. When the antibacterial polymer is contained within the antibacterial polymer composite in an excessively low content, it is difficult to exhibit a sufficient antibacterial effect. When the antibacterial polymer is contained in an excessively high content, in addition to microorganisms that generate odor components, it can also pose on a danger on the normal cells of the user, which is not suitable in terms of human safety. Preferably, within the antibacterial polymer composite, the antibacterial polymer is contained in an amount of 1% by weight or more, 5% by weight or more, 10% by weight or more, 15% by weight or more, or 20% by weight or more, and 45% by weight or less, 40% by weight or less, 35% by weight or less, or 30% by weight or less.

In addition, the antibacterial polymer composite can be used in household chemical products requiring antibacterial properties.

Hereinafter, the action and effect of the present disclosure will be described in more detail by way of specific examples. However, these examples are for illustrative purposes only, and the scope of the invention is not defined thereby.

Example 1: Preparation of Antibacterial Polymer PIA (Polyicaridinyl Acrylate)-1

(Step 1) Preparation of Monomer Compound Icaridinyl Acrylate

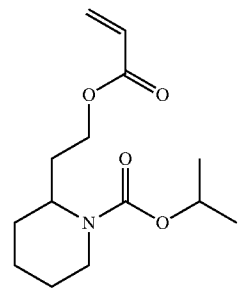 [SMILES: C=CC(=O)OCCC1CCCCN1C(=O)OC(C)C]

0.1 mol of icaridin (produced by Chem Scene LLC), 0.12 mol of triethylamine, and 20 w/v % mol of dichloromethane were put into a three-necked round-bottom flask capable of maintaining a nitrogen atmosphere, and the mixture was stirred at 200 rpm for 10 minutes. Next, 0.12 mol of acryl chloride was slowly added to the stirred solution maintained at 5° C., and then the reaction proceeded at room temperature for 5 hours. After the reaction was completed, the reaction mixture was extracted and washed using water. Next, the residual water was removed using magnesium sulfate, concentrated using a rotary evaporator, and then dried at 30° C. for 12 hours. Thereby, the title icaridinyl acrylate compound was obtained (17.2 g, Yield: 74%).

$^1$H-NMR (500 MHz, DMSO$_{d6}$): 0.9 (3H, CH), 1.3 (3H, CH), 1.4-1.8 (10H, CH), 3.3 (1H, CH), 3.6 (2H, N—CH), 4.1 (2H, O—CH), 4.7 (1H, CH), 5.8-6.5 (3H, acryl)

(Step 2) Preparation of Antibacterial Polymer PIA-1

[Chemical Formula 1-1]

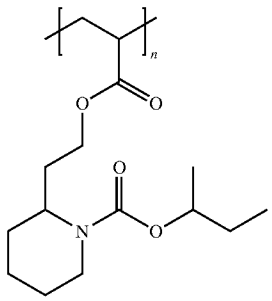

0.18 mol of the icaridinyl acrylate compound prepared in step 1 was dissolved in tetrahydrofuran solvent, 0.2 mol % of azobisisobutylonitrile was added under a nitrogen stream. The prepared solution was subjected to polymerization reaction at 60° C. for 20 hours, and then precipitated in methanol to terminate the reaction. Then, the resulting mixture was washed several times with water and then vacuum dried at 60° C. to obtain PIA-1 represented by Chemical Formula 1-1 (4.1 g, Yield: 82%).

At this time, the prepared polymer PIA-1 is a homopolymer consisting of the above-mentioned repeating units, wherein the weight average molecular weight of the homopolymer was 38,600 g/mol, and n was 68. At this time, the weight average molecular weight of the polymer was measured using GPC (Agilent 1200 series GPC) and was measured by dissolving the polymer in DMF.

Example 2: Preparation of Antibacterial Polymer PIA (Polyicaridinyl Acrylate)-2

0.2 mol % of azobisisobutylonitrile was added to 0.18 mol of the icaridinyl acrylate compound prepared in step 1 of Example 1 under a nitrogen stream. The prepared polymerization solution was subjected to a polymerization reaction at 60° C. for 5 hours, and then precipitated in methanol to terminate the reaction. Then, the resulting mixture was washed several times with water and then vacuum dried at 60° C. to obtain PIA-2 represented by Chemical Formula 1-1 (4.9 g, Yield: 98%).

At this time, the prepared polymer PIA-2 was a homopolymer composed of the above-mentioned repeating units, wherein the weight average molecular weight of the homopolymer was 96,000 g/mol, and n was 169. At this time, the weight average molecular weight of the polymer was measured using GPC (Agilent 1200 series GPC) and was measured by dissolving the polymer in DMF.

Example 3: Preparation of Antibacterial Polymer PIA (Polyicaridinyl Acrylate)-3

0.1 mol % of azobisisobutylonitrile was added to 0.18 mol of the icaridinyl acrylate compound prepared in step 1 of Example 1 under a nitrogen stream. The prepared polymerization solution was subjected to a polymerization reaction at 60° C. for 5 hours, and then precipitated in methanol to terminate the reaction. Then, the resulting mixture was washed several times with water and then vacuum dried at 60° C. to obtain PIA-2 represented by Chemical Formula 1-1 (3.2 g, Yield: 64%).

At this time, the prepared polymer PIA-2 was a homopolymer composed of the above-mentioned repeating units, wherein the weight average molecular weight of the homopolymer was 184,000 g/mol, and n was 324. At this time, the weight average molecular weight of the polymer was measured using GPC (Agilent 1200 series GPC) and was measured by dissolving the polymer in DMF.

Comparative Preparation Example 1: Preparation of Antibacterial Polymer PMA (Polymentholyl Acrylate)

(Step 1) Preparation of the Monomer Compound Mentholyl Acrylate

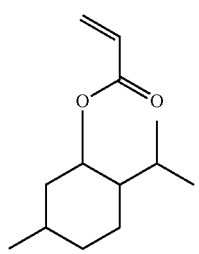

0.1 mol of menthol (manufactured by TCI), 0.12 mol of triethylamine, and 20 w/v % mol of dichloromethane were put into a three-necked round-bottom flask capable of maintaining a nitrogen atmosphere, and the mixture was stirred at 200 rpm for 10 minutes. Next, 0.12 mol of acryl chloride was slowly added to the stirred solution maintained at 5° C., and then the reaction proceeded at room temperature for 5 hours. After the reaction was completed, the reaction mixture was extracted and washed using water. Next, the residual water was removed using magnesium sulfate, concentrated using a rotary evaporator, and then dried at 30° C. for 12 hours. Thereby, the title mentholyl acrylate compound was obtained (16.2 g, Yield: 86%).

$^1$H-NMR (500 MHz, DMSO$_{d6}$): 0.9 (9H, CH), 1.1-2.0 (9H, CH), 4.5 (1H, O—CH), 5.6-6.4 (3H, acryl)

(Step 2) Preparation of Polymer PMA (Polymentholyl Acrylate)

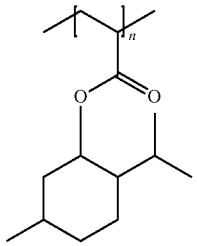

[Chemical Formula X]

0.032 mol of the mentholyl acrylate compound prepared in step 1 of Example 1 was dissolved in a tetrahydrofuran solvent, and then 0.2 mol % of azobisisobutylonitrile was added under a nitrogen stream. The prepared solution was subjected to a polymerization reaction at 60° C. for 20 hours, and then precipitated in methanol to terminate the reaction. Then, the resulting mixture was washed several times with water and then vacuum dried at 60° C. to obtain PMA (polymentholyl acrylate) represented by Chemical Formula X (3.6 g, Yield: 72%).

At this time, the prepared polymer PMA was a homopolymer composed of the above-described repeating units, wherein the weight average molecular weight of the homopolymer was 26,200 g/mol, and n was 83. At this time, the weight average molecular weight of the polymer was measured using GPC (Agilent 1200 series GPC) and was measured by dissolving the polymer in DMF.

Experimental Example 1: Antibacterial Test 1

Antibacterial tests were performed on the antibacterial polymers prepared in Examples and Comparative Examples. Specifically, in the antibacterial test, the bacterial growth inhibition rate (%) was measured by the following method. In addition, the bacterial growth inhibition rate (%) of Icaridin and Menthol acrylate as single molecules was also measured by the same method and shown as Comparative Examples 2 and 3.

0.1 g of the antibacterial polymer prepared above was added to 25 ml of nutrient broth culture medium inoculated with the test bacterium *Proteus Mirabilis* (ATCC 29906) at 3000 CFU/ml, and then incubated in a shaking incubator (VS-37SIF, produced by Visiontech) at 37° C. for 16 hours. The absorbance at 600 nm wavelength of the cultured solution was measured using a UV-Vis Spectrophotometer (Optizen POP, produced by K Lab). In addition, in a pure culture medium containing no antibacterial polymer, a solution prepared by culturing *Proteus Mirabilis* (ATCC 29906) at 37° C. for 16 hours was prepared as a control group, and the absorbance at a 600 nm wavelength was measured by the same manner as above. Using the measurement result, the bacterial growth inhibition rate (%) of *Proteus Mirabilis* (ATCC 29906) was calculated according to Equation 1 below, and the results are shown in Table 1 below.

$$\text{Bacterial growth inhibition rate (\%)} = \left(1 - \frac{A_S}{A_0}\right) \times 100 \quad \text{[Equation 1]}$$

In the above equation, $A_s$ is the absorbance of the experimental group, which is the absorbance at 600 nm wavelength of the *Proteus Mirabilis* culture medium to which the sample was added, and $A_0$ is the absorbance of the control group, which is the absorbance at 600 nm wavelength of *Proteus mirabilis* culture medium to which the sample was not added.

Experimental Example 2: Antibacterial Test 2

Antibacterial tests were performed on the antibacterial polymers prepared in Examples and Comparative Examples. Specifically, based on the ASTM E 2149 antibacterial test method, the bacterial reduction rate (%) was measured by the following method. In addition, the bacterial reduction rates (%) of Icaridin and Menthol acrylate as single molecules was also measured by the same method and shown as Comparative Examples 2 and 3.

The sample (0.2 g) was placed in a 50 mL conical tube, to which 1× PBS (10 mL) inoculated with *E. Coli* (1.5×105 CFU/mL) was added, and cultured for 1 hour and 24 hours in a shaking incubator at 37° C., so as to allow the bacteria and the material to come into sufficient contact with each other. In order to check the colony of *E. coli* in the cultured sample, the sequentially diluted solution was spread on a TSA Agar plate, and then cultured for 16 hours so as to form colonies in an incubator at 30° C. The degree of bacterial culture was grasped from the number of colonies formed, and the antibacterial performance was compared.

$$\text{Bacterial reduction rate} = \left(1 - \frac{C_S}{C_0}\right) \times 100 \quad \text{[Equation 2]}$$

In the above equation, $C_s$ is the number of microorganisms (CFU/ml) in the experimental group, which can be confirmed as the number of colonies formed on the TSA Agar plate, and $C_0$ is the number of microorganisms in the control group, which means the number of *E. Coli* in PBS to which the sample was not added.

TABLE 1

|  | Example 1 | Example 2 | Example 3 | Comparative Example 1 | Comparative Example 2 | Comparative Example 3 |
|---|---|---|---|---|---|---|
| Antibacterial polymer | PIA-1 | PIA-2 | PIA-3 | PMA | Icaridin | Menthol acrylate |
| Bacterial growth inhibition rate (%)[1] | 46.88 | 52.31 | 50.19 | 19.20 | 11.24 | 0.2 |
| 1 hour-bacterial reduction rate[2] (%) | 15.37 | 17.29 | 18.60 | 5.27 | 3.17 | 0 |
| 24 hour-bacterial reduction rate[3] (%) | 48.21 | 59.23 | 61.27 | 22.78 | 13.89 | 0 |

[1] Bacterial growth inhibition rate confirmed using the absorbance measurement method
[2] Bacteria reduction rate confirmed after 1 hour-contact using ASTM E 2149 test method
[3] Bacteria reduction rate confirmed after 24 hour-contact using ASTM E 2149 test method Referring to Table 1, it can be seen that in the case of the antibacterial polymers of Examples, they exhibit antibacterial properties against Gram-negative bacterium *Proteus mirabilis*. Specifically, it can be seen that in the case of the antibacterial polymers of Examples 1 and 2 prepared by introducing a polymerizable functional group to the icaridin-based compound and then homopolymerizing it, they exhibit significantly improved antibacterial properties as compared with the antibacterial polymer of Comparative Example 1 prepared by introducing a polymerizable functional group to menthol and then homopolymerizing it.

In addition, the antibacterial polymers of Examples 1 and 2 exhibit superior antibacterial properties as compared with single molecules, Icaridin and menthol acrylate.

Thereby, it can be seen that the polymers including the repeating unit represented by Chemical Formula 1 described above has a molecular weight above a certain level, so that unlike the monomolecular type antibacterial agent, they have high miscibility with other polymers and can be used during the melt extrusion process, and exhibit excellent antibacterial properties against Gram-negative bacteria as compared with the polymers using other terpene-based compounds such as menthol.

In particular, as a result of comparing the antibacterial performance according to the contact time between *E. Coli* and the antibacterial polymer, it was confirmed that the antibacterial performance is relatively low at 1 hour, whereas the microorganism and the antibacterial polymer can be made to come into sufficient contact with each other at 24 hours, thereby exhibiting relatively high antibacterial performance.

Experimental Example 3: Comparison of Thermal Decomposition Behavior (Step 1) Preparation of Antibacterial PMMA Poly(Methyl methacrylate) (TCI Chemical, CAS RN: 9011-14-7) was put into a Mixed Torque Rheometer (HAPRO), and then the temperature was raised to 160° C. and the mixture was mixed for 5 minutes. PIA-2 and icaridin were added in an amount of 40 parts by weight based on 100 parts by weight of poly(methyl methacrylate), respectively, mixed at a temperature of 160° C. for 30 minutes, and then cooled to room temperature to obtain a sample.

(Step 2) Thermal Decomposition Behavior

In order to confirm the thermal decomposition behavior of the prepared sample, experiments were performed as shown in Table 2 below using TGA (Thermogravimetric Analyzer, TA Instrument, DISCOVERY TGA 550 W/MFC & AUTO).

TABLE 2

|  | Temperature setting | Speed | Environment |
|---|---|---|---|
| Step 1 | From 30° C. to 150° C. | 10° C./min | Nitrogen atmosphere |
| Step 2 | Maintained at 150° C. for 10 minutes | 0 | |
| Step 3 | From 150° C. to 50° C. | −10° C./min | |
| Step 4 | From 50° C. to 600° C. | 10° C./min | |

The above results are shown in the FIGURE. In the FIGURE, as a result of step 4, it was confirmed that icaridin in the form of a single molecule proceeds decomposition from a lower temperature than that of PIA-2 in the form of a polymer. As a result, it was confirmed that the form of the antibacterial polymer in the extrusion process proceeding at a higher temperature is excellent in heat resistance as compared with that of a single molecule, which is advantageous for mixing.

The invention claimed is:

1. An antibacterial polymer comprising a repeating unit represented by the following Chemical Formula 1:

[Chemical Formula 1]

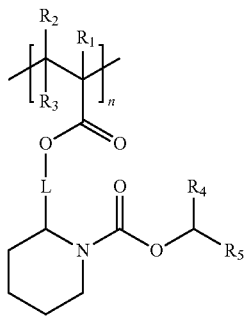

in Chemical Formula 1,
$R_1$ to $R_3$ are each independently hydrogen, or methyl,
$R_4$ and $R_5$ are each independently hydrogen, an alkyl having 1 to 10 carbon atoms, or an aryl having 6 to 30 carbon atoms,
L is a single bond, or an alkylene having 1 to 10 carbon atoms, and
n is an integer of 50 to 1,000.

2. The antibacterial polymer of claim 1, wherein:
$R_4$ and $R_5$ are each independently methyl, ethyl, or isopropyl.

3. The antibacterial polymer of claim 1, wherein:
L is methylene, or ethylene.

4. The antibacterial polymer of claim 1, wherein:
the antibacterial polymer comprises a repeating unit represented by the following Chemical Formula 1-1:

[Chemical Formula 1-1]

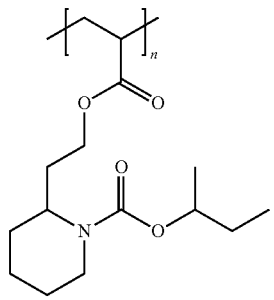

in Chemical Formula 1-1,
n is an integer of 50 to 1,000.

5. The antibacterial polymer of claim 1, wherein:
the antibacterial polymer is a homopolymer including only the repeating unit represented by the Chemical Formula 1-1.

6. The antibacterial polymer of claim 1, wherein:
the antibacterial polymer has a weight average molecular weight of 5,000 to 200,000 g/mol.

7. The antibacterial polymer of claim 1, wherein:
the antibacterial polymer exhibits antibacterial properties against Gram-negative bacteria.

8. The antibacterial polymer of claim 7, wherein:
the Gram-negative bacteria is *Proteus mirabilis*, or *Escherichia coli*.

9. An antibacterial polymer composite comprising the antibacterial polymer according to claim 1.

10. The antibacterial polymer composite of claim 9, wherein:
the antibacterial polymer composite further comprises one or more polymers selected from the group consisting of polymethyl methacrylate (PMMA), polyethylene (PE), polypropylene (PP), polystyrene (PS), polyamide (PA), polyimide (PI), polyethylene terephthalate (PET), polyvinyl chloride (PVC), acryloyl-butadiene-styrene (ABS) and polyacrylic acid (PA).

* * * * *